(12) United States Patent
Broder et al.

(10) Patent No.: US 8,788,819 B2
(45) Date of Patent: Jul. 22, 2014

(54) SYSTEM AND METHOD FOR A CLOUD-BASED ELECTRONIC COMMUNICATION VAULT

(75) Inventors: Andrei Broder, Palo Alto, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 24 days.

(21) Appl. No.: 13/457,744

(22) Filed: Apr. 27, 2012

(65) Prior Publication Data

US 2013/0290710 A1    Oct. 31, 2013

(51) Int. Cl.
H04L 9/32 (2006.01)
(52) U.S. Cl.
USPC .......................................................... 713/168
(58) Field of Classification Search
USPC .......................................................... 713/168
See application file for complete search history.

(56) References Cited

U.S. PATENT DOCUMENTS

| | | | |
|---|---|---|---|
| 6,493,716 B1 * | 12/2002 | Azagury et al. ........................ | 1/1 |
| 6,584,567 B1 * | 6/2003 | Bellwood et al. .............. | 713/171 |
| 2012/0311080 A1 * | 12/2012 | Alsina et al. ................... | 709/217 |
| 2013/0046840 A1 * | 2/2013 | Karkera et al. ............... | 709/206 |
| 2013/0054634 A1 * | 2/2013 | Chakraborty et al. ........ | 707/769 |

OTHER PUBLICATIONS

E. Ekonomou, An Integrated Cloud-based Healthcare Infrastructure, Nov. 2011, IEEE Third International Conference on Cloud Computing Technology and Service.*

F. Lins, SSC4Cloud Tooling: An Integrated Environment for the Development of Business Processes with Security Requirements in the Cloud, Publication year 2011, IEEE World Congress on Digital Object Identification.*
http://www.doxo.com "Your Digital File Cabinet"; doxo, inc; isited Apr. 27, 2012 6 pages.
http:www.doxo.com/how-it-works/ "How It Works"; doxo, inc; visited Apr. 27, 2012 7 pages.
https:www.dropbox.com/links/features "Simple, fast sharing"; Dropbox, 2 pages; visited Apr. 27, 2012.
https://www.dropbox.com/tour "The Dropbox Tour" Simplify Your Life; Dropbox 6 pages; visited Apr. 27, 2012.

* cited by examiner

*Primary Examiner* — Kambiz Zand
*Assistant Examiner* — Gita Faramarzi
(74) *Attorney, Agent, or Firm* — James J. DeCarlo; Greenberg Traurig, LLP

(57) ABSTRACT

Disclosed is a system and method for securely, conveniently and effectively storing information in a secure data repository or database, and securely delivering such information to a respective user. The secure repository and database, referred to as a Vault, is a secure storage utility used for storing and safekeeping valuable personal information and documents associated with a user. The Vault can store and provide access to personal documents for a user, such as but not limited to, wills, irreplaceable pictures or video, financial documents/bills, contracts, account numbers and credit card numbers. The Vault can be provided as a service within a smart, cloud-based system, which intelligently gathers, stores and initiates actions for a variety of user documents.

28 Claims, 7 Drawing Sheets

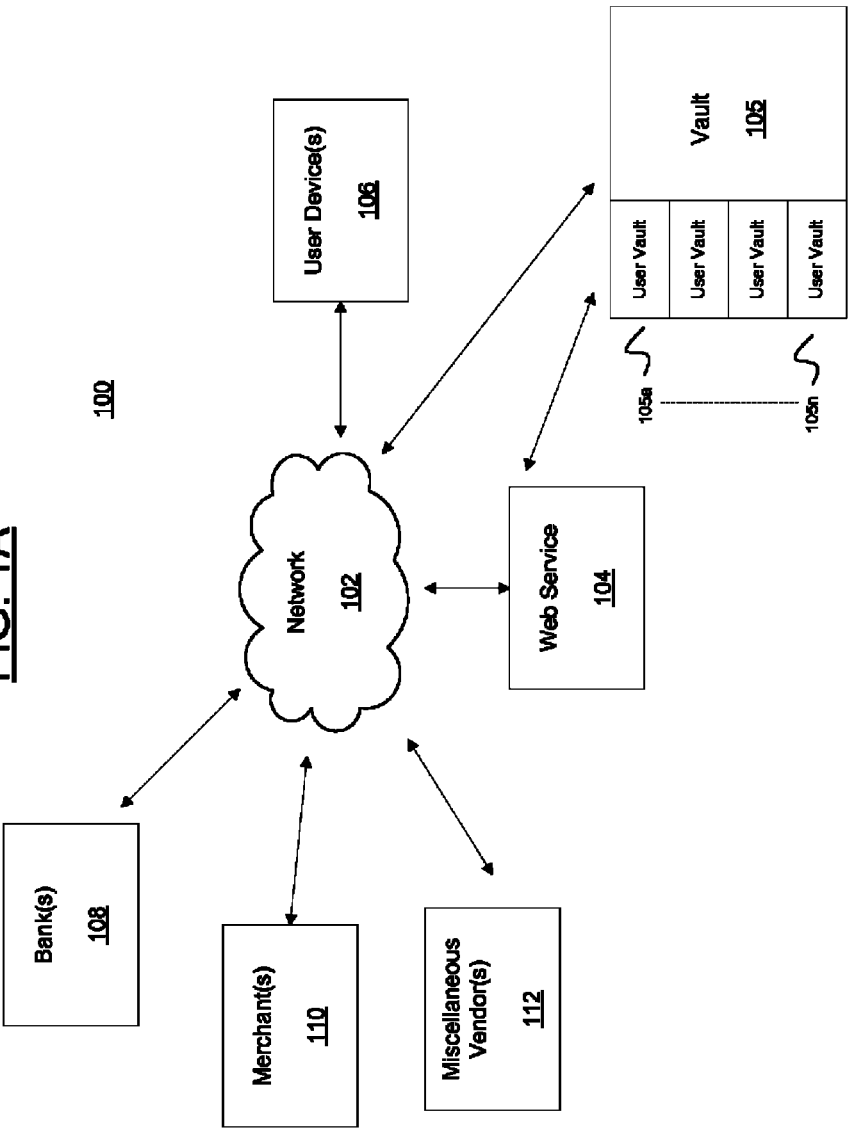

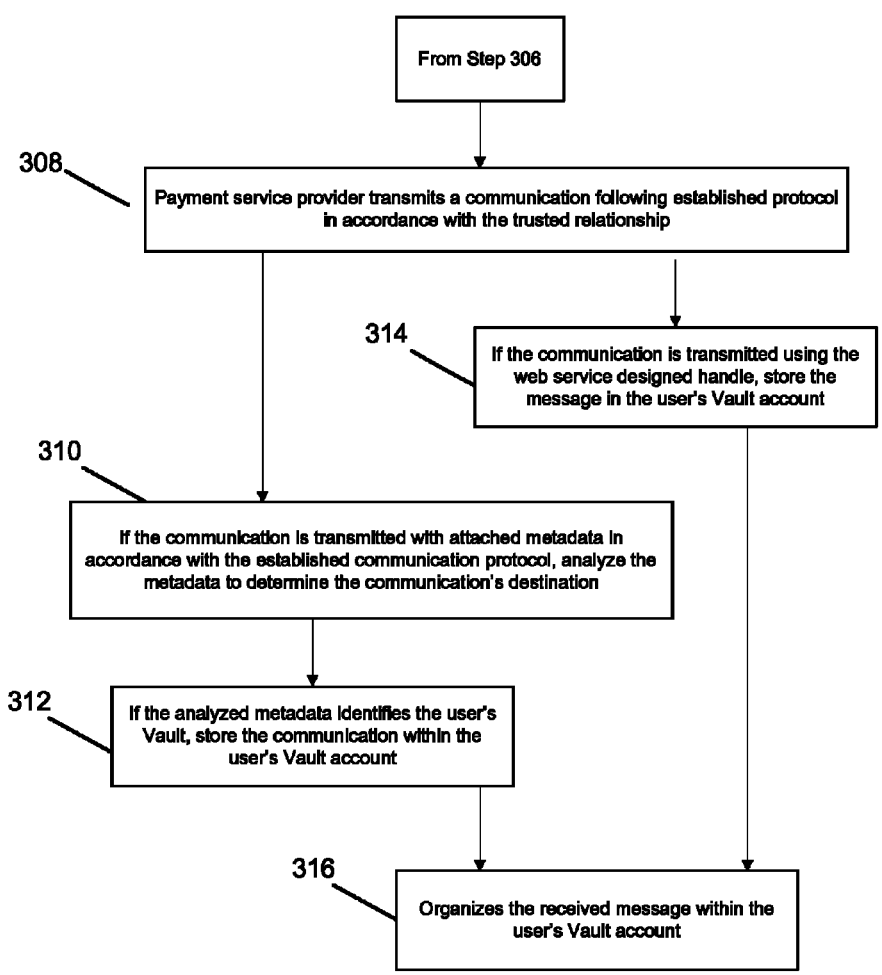

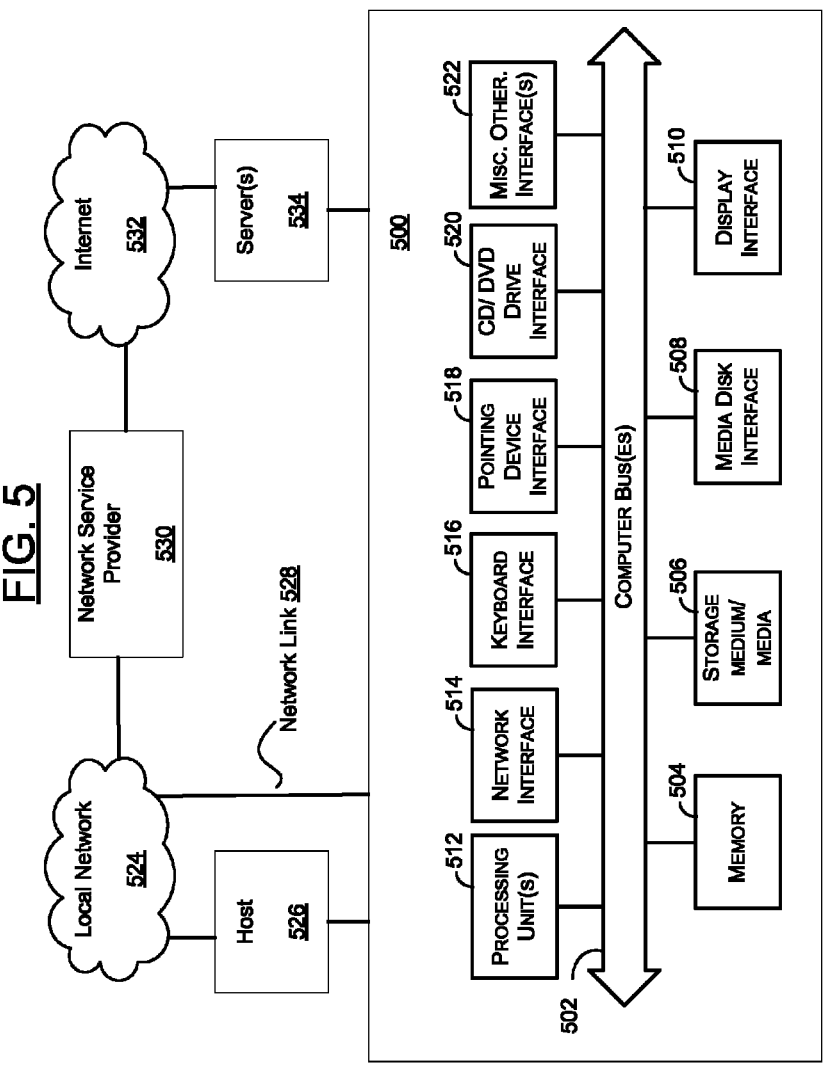

ically to performing data management operations, including content-indexing and policy driven storage within a cloud computing environment in order for a user to manage his/her personal information from a central online location.
SYSTEM AND METHOD FOR A CLOUD-BASED ELECTRONIC COMMUNICATION VAULT This application includes material that is subject to copyright protection. The copyright owner has no objection to the facsimile reproduction by anyone of the patent disclosure, as it appears in the Patent and Trademark Office files or records, but otherwise reserves all copyright rights whatsoever

FIELD

The present disclosure relates generally to secure management of personal information, and more specifically to performing data management operations, including content-indexing and policy driven storage within a cloud computing environment in order for a user to manage his/her personal information from a central online location.

RELATED ART

Most people receive several forms of electronic correspondence on a daily basis. With the constant influx of documents via e-mail, such as, billing statements the effort to securely manage documents is compounded. Consequently, service providers allow for online bill payment, paperless billing and other actionable services intended to allow customers to handle their obligations over a network (e.g., the Internet).

In addition, commercial entities (such as dropbox.com) provide various mechanisms for shared cloud storage of arbitrary data, and other entities (such as doxo.com) provide a "Digital File Cabinet" that allows the secure storage of confidential documents such as bills and statements.

SUMMARY

The present disclosure addresses failings in the art by providing a system and method for securely, effectively and conveniently assembling and delivering documents for online document management, such as facilitating electronic bill payment. The present disclosure allows a user to manage e-mail, and particularly, to securely consolidate and access personal and/or business information from a central off-site location.

In accordance with one or more embodiments, a method is which includes transmitting over a network from a user to an entity, a request comprising identification information associated with the user and provided by a web service. A response message is received from the entity which is addressed to the user. The response message is in accordance with the identifying information. The response message indicates a desire to establish a trusted relationship between the entity and the web service. The trusted relationship between the entity and the web service is confirmed based on the identifying information. A linkage is then established between the user and a user account within a cloud-based repository associated with the web service. Communication protocol is transmitted to the entity. The communication protocol includes instructions for communications between the entity and the repository.

In accordance with some embodiments, another method is disclosed for assembling and delivering documents for online document management. A message is received from an entity. The message includes metadata designated by established communication protocol between the entity and a web service. The metadata indicates a linkage between a user and a user profile within a cloud-based repository. The metadata is analyzed in order to identify the linkage. The message is parsed in order to identify information contained within the message or corresponding to the message. Based on such analysis, the message is communicated to the repository. The communication facilitates storing the message in the repository, where the storage organizes the message based on the identified message information.

In accordance with one or more embodiments, a non-transitory computer-readable storage medium is provided, the computer-readable storage medium tangibly storing thereon, or having tangibly encoded thereon, computer readable instructions that when executed cause at least one processor to securely, effectively and conveniently assemble and deliver communications within an online, cloud based document management system.

In accordance with one or more embodiments, a system is disclosed for storing information in a secure cloud-based data repository or database, and securely delivering such information to a respective user. The secure repository and database is a secure storage utility used for storing and safekeeping valuable personal information and documents associated with a user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 1A depicts an example of a system architecture according to some embodiments of the present disclosure;

FIG. 3B depicts a process flow diagram for receiving an communication from a payment service provider in accordance with some embodiments of the present disclosure;

FIG. 5 is a block diagram illustrating an architecture of a hardware device utilized to implement the electronic communication vault in accordance with one or more embodiments of the present disclosure.

DESCRIPTION OF EMBODIMENTS

Figure 1B:
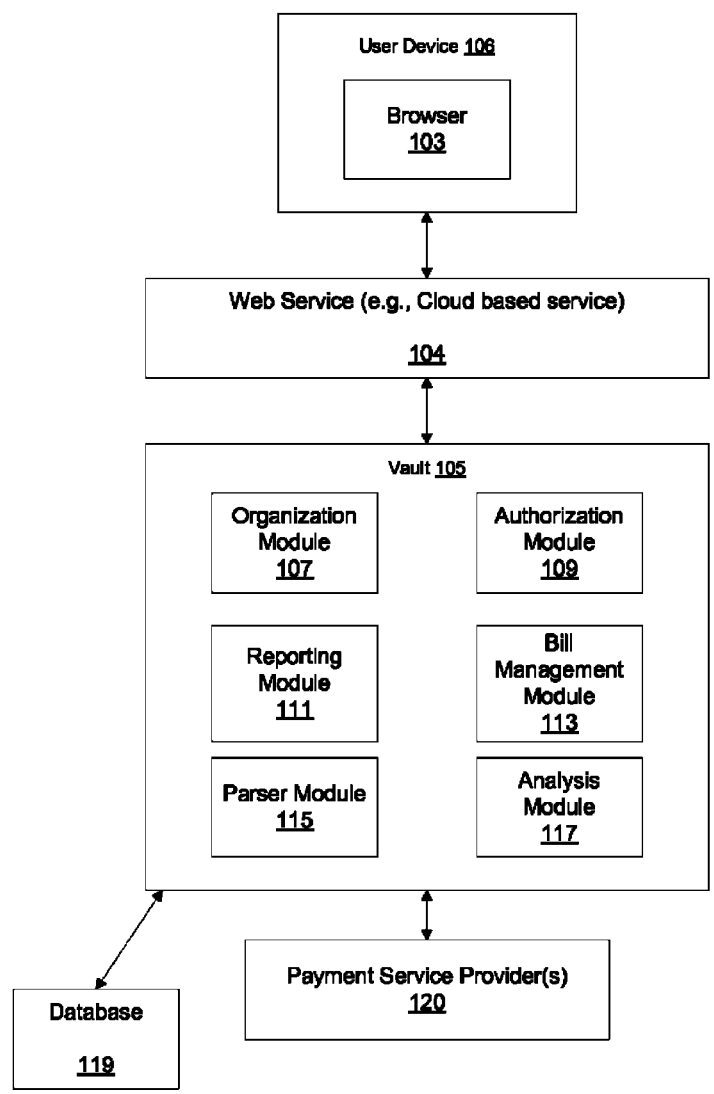
FIG. 1B depicts a block diagram of a system enabling the assembly and delivery of documents for facilitating electronic bill payment and online document management in accordance with some embodiments of the present disclosure.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server.

For purposes of this disclosure, a user device includes a processor and memory for storing and executing data and software. Computing devices may be provided with operating systems that allow the execution of software applications in order to manipulate data. In some embodiments, a user device can be a computing device, such as a personal computer (PC), web enabled personal assistant (PDA), a smart phone, a media player device, a tablet, a game console, smart TV or set top box. A user device can be connected to the network, such as the Internet, via a wired data connection or wireless connection such as a Wi-Fi network, a satellite network or a cellular telephone network. A user device can support any type of interface for enabling the presentation or exchange of data. In addition, a user device may facilitate various input means for, but not limited to, receiving and generating information, including touch screen capability, keyboard and keypad data entry and voice-based input mechanisms. Any known and future implementations of user devices are applicable.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

In general, the present disclosure provides a system and method for secure cloud storage referred to as a "Vault" or "lock box". As used herein, a "cloud" is used in an art-recognized manner and can refer to a collection of centrally managed resources such as networked hardware and/or software systems and combinations thereof provided and maintained by an entity, wherein the collection of resources can be accessed by a user via wired or wireless access to a network that may be public or private, such as, for example, a global network such as the Internet. Such centralized management and provisioning of resources can provide for dynamic and on-demand provisioning of computing and/or storage to match the needs of a particular application. The cloud may include a plurality of servers, general or special purpose computers, as well as other hardware such as storage devices. The resources can include data storage services, word processing services, payment remitting services, and many other information technological services that are conventionally associated with personal computers or local and remote servers. Moreover, in one aspect, the resources can be maintained within any number of distributed servers and/or devices as discussed in more detail below. Thus, the present disclosure discusses a system that performs data management operations, including content-indexing and policy driven storage, within a cloud computing environment in order for a user to manage his/her personal information from a central online location.

As discussed herein, the Vault can be a cloud-based data repository that functions as a secure "drop-box" for data that corresponds to a user. Security for the Vault can be facilitated through the use of known cryptographic techniques, such as for example, symmetric and/or asymmetric cryptographic keying technology. In other words, data that is 'dropped' by or on behalf of a particular user can be encrypted using a public key that corresponds to a user-specific private key. Therefore, although the data resides within the large pool of 'cloud-based' data, it is protected since it can only be decrypted by using the private key, which is kept secret and only available to the particular user.

In order to further facilitate user-centric secure storage, the Vault can be partitioned such that the cloud-based repository is divided into multiple partitions. Each of these partitions can correspond to individual user's profile. The information secured in these profiles can be stored according to any number of indexing criteria now known or to become known, including, but not limited to, intended user identity, data type, data content, data topic, author and context. Thus, the Vault can provide for automatic analysis of incoming data to determine an intended recipient as well as index criteria. This information can be used to determine an appropriate location (e.g., partition for a user profile) within the data repository to store the data. Additionally, this information can be used to locate and/or generate appropriate keying material to encrypt (and/or decrypt) the data.

According to some embodiments, the Vault can employ artificial intelligence (AI) and/or machine learning and reasoning (MLR). Such techniques may be provided to employ a probabilistic and/or statistical-based analysis to prognose or infer an action that a user desires to be automatically performed. For example, AI and MLR mechanisms can be employed to infer a user's identity based upon most any number of context and/or biometrical factors. As well, AI and/or MLR can be used to infer a storage location for messages within the Vault based upon criterion including, but not limited to intended user identity, data characteristics, and identity of the entity dropping the data.

An exemplary embodiment of the present disclosure involves the cloud-based Vault being used to store account and billing statements and similar documents associated with a user received from banks, vendors, merchants, or similar providers and entities.

By way of background, despite providers' incentive laden offers for users to go paperless, there still exists a large majority of users that receive physical bills via the postal service. Some companies have even attempted to instill negative incentives, where, should a customer receive a bill via physical mail, they would be penalized. Such attempts resulted in small, if not negligible results.

Although physically delivering mail is still very popular and widely used, many companies and users (or customers) are now using the Internet and the World Wide Web (WWW) as an alternative to sending and receiving mail. Some advantages of using the Internet and the WWW are the reduced cost and the instantaneous access to correspondence. Partly because of these reasons, the use of electronic mail (email) has become an everyday practice in homes and businesses, and is generally known and accepted in the public.

On the average, a person can receive hundreds, or perhaps thousands of bills every year. Along with the bills, a person may receive other types of mail such as, but not limited to, personal letters, magazines, advertisements, accounts payable, invitations. As people become busier, managing mail, and particularly bills, can become a time consuming and burdensome process. For example, when a particular item of mail is received, one must open it and spend the necessary time reading it to determine its level of importance. After determining that the particular mail is a bill and is of high importance, the bill is usually set aside and not acted upon until a later date. When this later date arrives, the bill may not have been timely acted upon by the person depending on the memory and/or time constraints of the person. If the bill is not timely acted upon, a merchant will generally assess a late fee and/or additional charges as a result of this delay. Even if the person can pay the bill on time, the person must spend the necessary time replying to it. For instance, the person must write out a check, balance the corresponding bank account, prepare the reply envelope, and send off the check along with the corresponding bill statement. When considering the large number of bills a person must reply to in a year, this traditional method is very time consuming and burdensome, and can lead to inaccuracies in payment. Furthermore, the traditional method described above is also inefficient and can be costly for all parties.

The systems and methods currently available for managing mail/bills via paperless billing are an improvement in this field. Currently only about 13-15% of consumers receive bills online. For example, there are many businesses that are scanning paper mail into electronic format so that an employer/employee may access the mail from a remote location. This conventional method, however, does not provide a method for managing bills.

Accordingly, assuming an increase of bills received online, through a cost effective and efficient manner, as discussed herein, the payment service providers who are incurring costs for sending such mail to customers would see increases savings and profitability. Thus, there is a need for a system and method that can manage electronic bills in a consistent and reliable manner.

Even further, some current data repository (or cloud based) systems provide users (or consumers) with a consumer level storage. Such storage enables sharing of the information between a small number of users, where each user has equal access. Each of these users having access to the information also have read and write ability. The present disclosure remedies such short comings and expands the scope of such repositories by providing unlimited storage for any magnitude of accredited (or recognized users). That is, users are provided with a multitude of information, or documents, from which only the associated user has secure access and management access to such documents. That is, only the associated user of the information has read (and/or write) ability to the information/documents stored in their Vault. The ability to read/write to the documents can be provided via email integration via the web service provider providing the Vault, as discussed in more detail below.

The present disclosure provides a system and method for securely, conveniently and effectively storing information in a secure data repository or database, and securely delivering such information to a respective user. According to some exemplary embodiments, delivery of such information occurs through an email integrated cloud delivery system, as discussed herein. The secure repository and database, referred to as the Vault, is a secure storage utility used for storing and safekeeping valuable personal information and documents associated with a user. Therefore, the mechanism by which users can receive paperless billing and securely remit payment is simplified and increasingly cost efficient.

Various monetization techniques or models may be used in connection with electronic mail management, as discussed herein. Electronic mail payment and transmittal costs may be divided between parties including one or more publishers or publisher networks, and one or more marketplace facilitators or providers, potentially among other parties.

According to some embodiments, the Vault can store and provide access to personal documents for a user, such as but not limited to, wills, irreplaceable pictures or video, financial documents/bills, contracts, account numbers, credit card numbers, and Personal Identification Numbers (PIN). The Vault can be provided as a service within a smart, cloud-based system, which intelligently gathers, stores and initiates actions for a variety of user documents. Cloud-based applications may be implemented and accessed in the form of a web service provided by a user's service provider or as a browser application.

The Vault can be provided within a cloud-based computing environment by a network accessible service provider, such as, for example, YAHOO!®, in that upon a user signing up for, or registering with the service, the user can be assigned, or afforded the opportunity to sign up for their own respective Vault. Within the scope of the present disclosure, a service provider can include an email provider, such as YAHOO!® Mail. Therefore, upon a user activating their own email account, the user can be assigned their own personal Vault account within the cloud. If a user already has an email account, the user will be afforded the ability to sign up separately for their own email account. According to some embodiments, each user's Vault account can be associated with their own URL address, handle, metadata and/or personal key, so that personal emails and Vault bound emails do not co-mingle within a user's email inbox. This will be discussed in more detail below.

The preferred embodiments of the present disclosure will now be described with reference to FIGS. 1-5. The embodiments of the present disclosure allow a user (or client or subscriber) to manage email, and particularly consolidate, access and/or process personal and/or business messages and bills from their own personalized Vault (a central online, cloud-based service). The Vault can be accessed with any known electronic device capable of receiving and transmitting data over a network, such as, the Internet, via a wired data connection or wireless connection such as a Wi-Fi network, a satellite network or a cellular telephone network.

Although the various exemplary embodiments are described with respect to a document management system for electronic billing services, or the like, it is contemplated that these embodiments have their applicability to any data protocols, methodologies or systems for, but not limited to, facilitating document exchange, payment processing, online bill management, data warehousing and business intelligence. Moreover, one skilled the art will appreciate that various substitutions and modifications can be made to the examples described herein while remaining within the sprit and scope of the present disclosure. For example, the present disclosure can be related to the retrieval and cloud storage for, but not limited to, medical records, children's report cards, credit score reports, student loan emails, and insurance benefit statements.

FIG. 1A illustrates an exemplary environment 100 for providing a user with secure information storage and delivery via a web service 104 (or web portal). The web service 104 provides a personalized Vault 105 for each user affiliated with the web service 104. As will be discussed in more detail below, in connection with the web service 104, emails and bills associated with each user can be managed by a respective Vault 105 for each user. The web service 104 hosts the Vault 105 over the network 102. The Vault 105 is provided within a cloud-based, or cloud-computing environment. That is, the Vault 105 is maintained as a service(s) by the web service 104, whereby resources, software, and information are provided to devices on the network 102 as a utility. The services that drive the Vault 105 are based on network protocols derived from the network 102, and may involve dynamically scalable and often virtualized resources. The Vault 105 services can be accessed, for example, through a web browser implemented by the user device 106.

The web service 104 monitors communications between the user device 106 and other users/entities the user device interacts with. For example, as shown, user device 106 receives communications from banks 108, merchants 110 and miscellaneous vendors 112. It should be understood that the preferred embodiment of the present disclosure can utilize any number of user devices, merchants, banks, vendors or the like, and that other institutions may be substituted for the ones described above. For example, such institutions can include billers, consumers, banks and other financial institutions, electronic payment facilitators, and web portals. Emails and bills can be sent/forwarded to and from the user device 106 via the web service 104. As described in more detail below, once the emails are received, they can be sorted, parsed and processed, and stored in the Vault 105 based on their attributes, which include but are not limited to the sender's or recipient's address, metadata associated with the email and/or attachments, and the message's context. That is, the Vault 105 consolidates the electronic mail and bills into an easily manageable and accessible manner for each user.

According to some embodiments, the Vault 105 can act as an inbox for messages received from entities or other users. According to some embodiments, as discussed below, the Vault 105 can act as an intermediary or hub between a user and other users/entities. That is, in addition to storing the messages received for the user, the Vault 105 can notify the user of such correspondence. Overall, the Vault 105 provides document storage tools and solutions. Additionally, in some embodiments, the Vault 105 can facilitate bill payment solutions to enable users to manage the flow and maintenance of information, as discussed in more detail below.

In some exemplary embodiments, as discussed herein, the Vault 105 provides partitioned off-site repository(ies) for each user signed up for the service. Therefore, effective drop boxes are established for each user according to, but not limited to, users' identity and type of data. Furthermore, each user profile within the Vault 105 can employ different encryption strengths and/or algorithms, as discussed in more detail below. In order to monetize this, service providers can structure different pricing/fees in accordance with encryption strength. For example, a higher subscription fee can be charged for higher security storage. In other scenarios, company or organization-specific data, even when encrypted, can be stored in a separate directory from that of other companies, organizations and/or users. In some embodiments, government rules and/or regulations can require different characteristics of encrypted data.

FIG. 1B is a diagram of a system for enabling the assembly and delivery of messages within for facilitating electronic bill payment and online management. As used herein, a message refers to an electronic correspondence for conveying content such as, but not limited to, text, graphics, interactive media, and graphics primitives to a user by way of a browser, web portal or other graphical user interface which are displayed on a display associated with a user device 106. Messages deemed to be of particular importance to a user may be appropriately classified, tagged, retrieved and managed by the web service 104, and ultimately stored within the Vault 105. Such messages may include, but are not limited to, bills, notices, legal correspondence, receipts, service agreements and other information.

The system 100 enables users to manage, retrieve and interact with messages over a network by way of a their own personalized Vault accounts 105a-n within the Vault 105. By way of example, the Vault 105 provides one or more functions and mechanisms for retrieving, storing, categorizing and managing messages with respect to particular user's account within a personalized Vault account 105a-n. That is, each user with an established linkage with the Vault 105, as discussed in more detail below, is assigned or may establish a Vault account 105a-n. The capabilities of the Vault 105 may be accessed via a browser 103 running on any network capable device, such as user device 106.

According to some embodiments, the Vault 105 can be configured to support electronic billing applications and services in order to optimize message processing typically associated with a user's billing experience. By way of example, the Vault 105 enables users to receive personalized online billing offerings from payment services providers 120 (e.g., organizations, such as Banks, Credit institutions, and/or other merchants/vendors who provide services to the users for which payment is required, as discussed in FIG. 1A). The Vault 105 enables users to easily customize how and when such payment service providers 120 (or billing organizations or entities, or other users) provide their bills. The Vault 105 can execute one or more actions in response to presentation of a message to a user, including analysis, notification, communication, storage and/or payment options. For example, the Vault 105 can facilitate configuration of message presentation to the user device 106 based on the type of device being used to view the message (e.g., mobile device, smart phone, netbook, laptop and tablet.).

According to some embodiments, the Vault 105 can be configured to interface with one or more service providers 120 in order to access the data needed to facilitate and support electronic billing capabilities (e.g., financial data, user account information). According to some exemplary embodiments, the Vault 105 is maintained by the web service 104. For example, the Vault 105 enables any registered users of the web service 104 to access their billing statements or other vital messages. As discussed in relation to FIG. 3, registration by a user enables the user to interface their own personal Vault 105 with payment service providers 120 for which the user is expected to remit payment.

By way of example, if User A has signed up for paperless statements from Merchant B, Merchant B normally would send billing emails to User A's email address—for example: userA@yahoo.com. As discussed in more detail below, implementing the Vault, Merchant B will still send billing emails to User A, but instead of User A's email address, the billing emails will be sent to User A's Vault. That is, all emails from Merchant B involving billing, would be sent to User A's Vault. The reception of billing emails at User A's Vault avoids billing emails being lost or confused with personal emails within User A's email inbox. Also, the Vault can communicate a notification to User A indicating a billing email pending in his/her Vault. The notification can include, but is not limited to, messages comprising MMS, SMS and email. Therefore, User A can access his Vault, and begin the process of remitting payment directly. In some embodiments, as discussed below, the Vault can be configured to provide functionality so that payment can be made to Merchant B through the Vault. This can eliminate the need for User A to have to view the billing email, then access Merchant B's website in order to make said payment.

The Vault 105 includes various executable modules for performing one or more computing, data processing and network based instructions that in combination can enable document management and electronic billing services. Such modules can be implemented in hardware, firmware, software, or a combination thereof The Vault 105 may include an organization module 107, authentication module 109, a reporting module 111, a bill management module 113, a parser module 115 and an analysis module 115. It is noted that modules 107-117 provide the core intelligence of the Vault 105 for effectively processing the transmitted/submitted messages and interacting effectively with payment service providers 120.

According to some embodiments, the organization module 107 enables the effective grouping and/or sorting of messages and data within the user's designated storage within the Vault 105. According to some embodiments, as discussed in further detail below, grouping/sorting of messages may also be based upon user defined rules and feature settings. The organization module 109 also influences how the user accesses, searches and retrieves messages and correspondence maintained within the Vault 105. As an example, the organization module 107 can be used to group the user's bills, statements and messages in specific ways. For example, grouping all the bills for a second home together, grouping all the receipts associated with a holiday together, grouping all the bills from a particular service provider together, grouping all the bills for a given time period together, or other logical or user-specified groupings. Furthermore, the organization module 107 can be used to coordinate the arrangement of messages to be viewed by the user by, but not limited to, priority, due date, specific workflow, company name and bill type.

According to some embodiments, the parser module 115 (or parser) parses the messages received at the Vault 105 from the payment service providers. The parser module 115 thereby can determine the inherent makeup of the data within the message, contextual features of the message, inherent data structure underlying or forming the message, or information extractable from a message. Having processed the received message in this manner, the parser 115 can further translate this data into object code for effective use by the various other modules within the Vault 105. According to some embodiments, the parser 115 can also be used to parse incoming messages/emails in order to properly sort them within the Vault 105. For example, if an email is received that relates to payment of a cellular phone bill, the parser 115 can parse the message (and any identified attachments) and identify information including, but not limited to, the billing entity, billing type, bill amount, and due date. Any of the known or future parsers are within the scope of the present embodiment, such as, but not limited to XML parsers and JAVA parses.

According to some embodiments, the analysis module 117 and reporting module 111 respectively, analyze messages and data as stored to the Vault 105 and present reports and/or recommendations based on the analysis to the user device 106. For example, the analysis module 117, at the request of the user or as defined in accordance with system settings, can analyze different billing statements to determine and report how each bill compares to previous bills (e.g., compare heating bills for December of this year to December of last year). As another example, the analysis module 117 can analyze how the user's utility consumption compares to the average (their average, company average, regional average, national average) and how their usage changes throughout the year.

The result of any analysis performed can be presented to the user by the report module 111 in the form of notifications, email correspondence, summary reports or the like. The Vault 105 can provide presentation and access to specific content via a user interface that often contains virtual structural elements like directories or folders, along with administrative ability to control user's rights to specific content. This will be discussed in further detail below. Additionally, the reporting module 111 may further inform how the web service 104 manages the presentation and execution of data/queries pursuant to the preferences, features or settings of the user.

According to some embodiments, the billing management module 113 facilitates the exchange of bill payment/subscription payment information with one or more payment service providers 137 so as to enable convenient paperless billing and bill payment services. By way of example, and discussed in further detail below, for users who have established paperless billing with their payment service providers 120, and have established the connection between the Vault 105 and the service provider 120, the billing management module 113 can coordinate the service on the user's behalf (e.g., online credit card bill payment, utility bill payment, cell phone service payment), ensuring the direction of electronic correspondence for said service provider 120 is directed to the Vault 105 account related to the user. In this way, billing statements and other messages and/or correspondence between the user and service provider 120 are conveniently stored for the user to the Vault 105. In some embodiments, the billing management module 113 enables users to pay electronic bill via credit card, ACH, or electronic funds transfer or using any other mode or medium of payment or reconciliation. The billing management module 113 can also support payments between different user bill portfolios.

The billing management module 113 can operate in connection with the organization module 107 and/or analysis module 117 to automatically analyze incoming bills and statements to determine payment due dates. Such information can be communicated to the user via an email correspondence, or, for example, be added to an online calendar associated with the user. The reporting module 111 may then be configured to send the user timely payment reminders by email and/or text message based on the determined payment due dates, and/or the user's settings.

According to some embodiments, the authentication module 109 can be configured to authenticate users and their associated user devices 106 for interaction with the Vault 105. As discussed in detail in relation to FIG. 2, the authentication process involves a user having an affiliated email address with the web service 105. If the user does not have an email address, in order to use the Vault 105 service, the user registers for an email address. Once a user has an email address, the user can be assigned their own respective Vault 105. Embodiments can also exist where a user must register, or sign up for the Vault 105 service in order to be assigned his/her respective Vault account 105a-n.

By way of example, the authentication module 109 receives a request to subscribe to the Vault 105 for enabling document management, message delivery and integrated electronic billing services. The subscription process may include enabling various user settings or preferences, including, but not limited to, preferred content presentation settings, update or refresh settings, data organizational settings (e.g., for guiding execution of the organization module 107), login and password settings. Preferences and settings information is referenced to a specific user, user device, or combination thereof, and maintained as profile data within the web service 104.

The authentication process performed by the authentication module 109 may also include receiving and validating a login name and/or user identification value as provided or established for a particular user during a subscription or registration process with the service provider 120. The login name and/or user identification value may be received as input provided by the user from their user device 106 to the Vault 105. Registration data (as maintained in Vault 105 and/or web service 104) for respective users (or subscribers), containing pertinent user or device profile data, may be cross referenced as part of the login process. According to some exemplary embodiments, login process may be performed through automated association of profile settings maintained at the web service 104 as registration or profile data. For example, the profile data can include an IP address, a carrier detection signal of a user device, mobile directory number (MDN), subscriber identity module (SIM) (e.g., of a SIM card), radio frequency identifier (RFID) tag or other identifiers.

According to some embodiments, the messages, profile data and other information housed within the Vault 105 may be stored in an associated database 119. The database 119 may be in direct communication with the Vault 105 and/or web service 104, or may be housed within the Vault 105 as a local datastore.

Also, it is noted that modules 107-117 may interact with one another to provide an integrated suite of capabilities, features and options to the user. Although the exemplary Vault 105 is described as being comprised of the various components discussed herein, fewer or more components may comprise the Vault 105 and still fall within the scope of various embodiments. Indeed, rather than just bill payment, the Vault 105 provides several integral executables modules for enabling a centralized message management experience.

Figure 2:
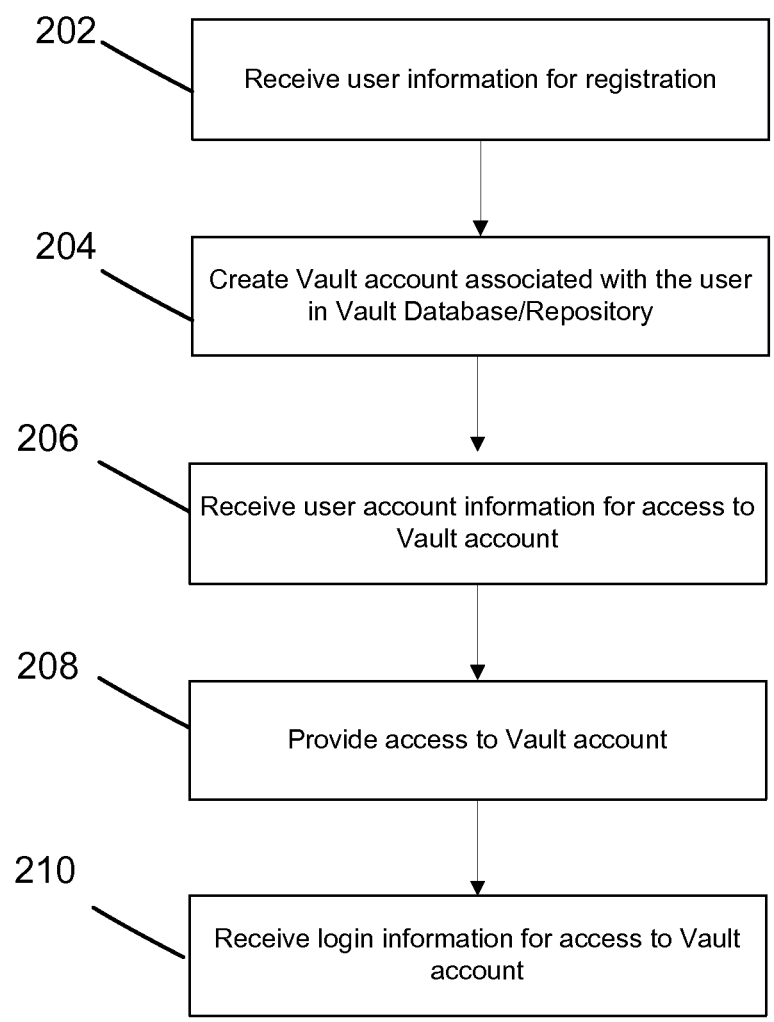
FIG. 2 depicts a process flow diagram for installation and access to a web vault in accordance with some embodiments of the present disclosure.

Turning to FIG. 2, illustrated is an exemplary process diagram for registration and access to the Vault 105. In an exemplary process, the web service 104 receives registration information from the user associated with the user device 106 to create an account. Step 202. The registration information can include the user's email address. The registration information can also include, for example, residence and billing information. As discussed above, if the user does not have an email address with the web service, the user must first create an email address with the web service. This ensures the user's Vault account that is being created is associated with the user's email address. Embodiments also exist where registration occurs automatically upon the web service 104 detecting the user has an affiliated email address. After receiving the user registration information, a secure vault account is created for the user. As discussed above, the vault account and associated profile data can be hosted by the web service 104, where the account information is stored in the database 119. Step. 204. The user's vault account can be housed within a special secure area in the cloud through the web service 104.

For example, the web service 104 is YAHOO!®, and particularly YAHOO!® Mail. If User A has an email address with YAHOO!® Mail, the user can provide his/her email address. For example, User A can provide, as registration information, his email address—userA@yahoo.com. The web service 104 then assigns User A with his/her own personalized vault account within the Vault 105. Therefore, User A's Vault account can act as an inbox for messages received from entities or other users. Further, as discussed in more detail below, the user's Vault account may be identifiable by metadata and/or via a designated Vault message handle so that only messages received from entities or services under a trusted relationship are housed in the Vault 105.

According to some embodiments, the Vault account for a particular user can be created internally by the web service 104. By way of example, User A has an email address: userA@yahoo.com. After registration of User A's Vault account, his/her Vault account is affiliated with the email address: userA@yahoo.com. In order to create the affiliation, the web service can create an extension within the web service's domain. The extension can be in a form of metadata. Thus, for example, User A's Vault handle can be—userA@yahoo-vault.com. In some embodiments, this extension handle would be internally created by the web service which can be the mail service or Vault service provider. Embodiments can exist where such extension handle would be unknown to User A. As discussed in more detail below, messages communicated to the user, which are destined for the Vault, may be addressed to the Vault's handle (or extension) within the web service 104 domain. Therefore, upon receiving the message, the mail or service provider server(s) would identify the handle, and automatically communicate the message in the Vault 105 for storage and allocation within the user's Vault account 105a-n. In some other embodiments, the Vault 105 can be a database affiliated with the user's email client, in that upon receiving an email designated for the Vault, the email client would recognize some form of metadata, e.g., an extension, and immediately transfer the message to the Vault 105.

In Step 206, the user can provide login information as a form of identity confirmation in order to securely access his/her vault account. The Vault login information facilitates secure, controlled access to the Vault 105. As discussed herein, the login information can be any desirable schema or paradigm, including a pin or unique identification number or characters, or an encryption key. Login information may also require additional authentication measures including a credit card number, SMS to registered phone, challenge questions, biometrics, or any other authentication measure(s). In some embodiments, the user may provide a unique access code and a password. Alternatively, the access code and password may be assigned to the account by the web service 104.

According to some embodiments, the access code and password may be some other form of security. In some embodiments, a layer of security may be applied either in addition to the access code and password or in lieu of the access code/password in order to ensure a high level of security. For example, the layer of security may include biometrics, highly complex password requirements, an RSA Secure ID, or any other known or to be known security feature. Both the access code and password, in addition to the alternative higher level of security options, can automatically apply rule-based encryption to the Vault 105. This security can be configured so as to be compatible with existing firewalls, with SMPT mail systems, and can complement a web service's security client software. Additionally, the security features of the Vault 105 can secure the messages residing within the Vault 105, and the messages being transmitted to and from the Vault on an enterprise-wide basis for communications outside of a firewall. This advanced security promotes interconnectivity between users and the Vault 105 via a centralized key and message system management, while still maintaining a high level of security.

Additionally, this can reduce/relieve the burden on the users to maintain a list of encryption keys. The encryption can be a standard 256 bit AES (Advanced Encryption Standard) algorithm, approved by the NIST (National Institute of Standards and Technology), and uses both Symmetric and Asymmetric encryption/decryption keys. Thus, the communications associated with the Vault 105 can be encrypted as well as any attachments associated with such communications. Therefore, only the user, which is granted the access code and password (or encryption key) can access the communications housed in the Vault. As discussed above and in further detail below, the Vault is associated with a user's email service. In line with the advanced security provided by the Vault, even the user's email service will be unable to retrieve and/or read the secured Vault messages. That is, the user will be unable to access the Vault from their email inbox. The user needs to separately initiate and complete an authentication process in order to access their Vault.

For example, upon reception of a message at the Vault 105, the disclosed system can facilitate encryption of the data received such that the data is secured and limited for use by the user. This limited use can be effectuated by the user's control of the private key (or login credentials) needed for decryption of the stored data. The Vault 105 can effectively enable information to be stored in the cloud while preventing unwanted or unintended disclosure of the information. Thus, the Vault 105 can provide mechanisms whereby the information within the Vault 105 can be decrypted and made available to users as desired and/or permitted. This is beneficial in the event the user's email address is victim to a phishing scheme, or having been hacked, the Vault 105 is hosted separately, thereby an additional step in preventing identity theft is achieved.

In Step 208, the user is provided access to the Vault. According to some embodiments, the user may access his/her vault account via a browser running on the user device 106. In this embodiment, the Vault is made accessible from the user's email client. In some embodiments, the user can download a software application, referred to as the vault application. The vault application provides secure access from the user device 106 to the Vault 105. The vault application is typically a software program that is installed and runs locally on the user device 106. Alternatively, the vault application may be a web-based program running on the web service's 104 application servers. In this instance, the vault application is executable via a browser on the user's user device 106. The vault application allows the user to access the Vault 105 and vault account information associated with that user in a secure manner.

According to some embodiments, during or after the vault application download the web service 104 may generate and install at least one soft token (i.e., software token) on the user device 106. The soft token can comprise secret or public-key cryptography used to authorize the use of the computer services provided by the web service 104. If the vault application is a web application running through a browser, the soft token may be in the form of a cookie. The soft token can be used to ensure that a user of the user device 106 and/or the user device 106 is associated with a valid user and is associated with the user's account 105*a-n* within the Vault 105. In other words, a linkage between the user (or user device 106) and the user's account 105*a-n* within the Vault 105 can be authorized and/or established via the soft token or via other known or to be known cryptographic or encryption keys. The soft token can also be used for user authentication during retrieval of messages stored in the Vault 105.

Once the vault application is running, the user may sign in to his/her Vault 105 account using the login information. Step 210. As discussed above, the login information for the user's Vault account may comprise, but not limited to, at least one of, access code and password and encryption key(s). As discussed above, the vault application may be rendered by a browser via a web-based program, locally through a downloaded version of the vault application or via a web interface provided by the web service 104. The access code and password validation may occur at the vault application, at the Vault 105, or at the web service 104. In some embodiments, the soft token may keep count of the number of times the user enters the access code and password, and block out the user if the access code and/or password are entered incorrectly more than a predetermined number of times.

These security options enable the web service 104 and/or Vault 105 to secure data for others and maintain the ability to access and process data. By analogy, an electronic mail exchange server may prevent account holders from viewing email associated with other account holders, but the exchange server itself can retain the ability to view mail of all the account holders. This characteristic is particularly important within cloud-based storage and subsequent provisions of services. That is, because hardware resources are not limited to a local environment, more complex security mechanisms (e.g., encryption, soft token) can be employed to secure storage of data in the off-premise/cloud environment. Thus, the Vault 105 can provide storage of the data from a third-party service provider on behalf of the intended user, however the access information is maintained by the user. In some embodiments, an encryption key (e.g., soft token or private key) can be maintained at the user device (by the user). In some embodiments, the key can be maintained at an edge device that serves as an access point to the Vault. In other embodiments, the key can be maintained in the cloud, such that the encrypted data can be downloaded to the user device, then decrypted locally. The increased and separate security required for accessing the Vault enables safeguarding of the Vault's messages should the user's email inbox become compromised. The separate security features, such as the separate secure logins and separate off-site storage enables safe and secure message storage in the Vault should the user's email inbox become subject to phishing, spoofing, or other hacking attempts. Thus, since the Vault is only affiliated with the user's inbox, and not subject to mutual access, such security breaches can be avoided.

Figure 3A:
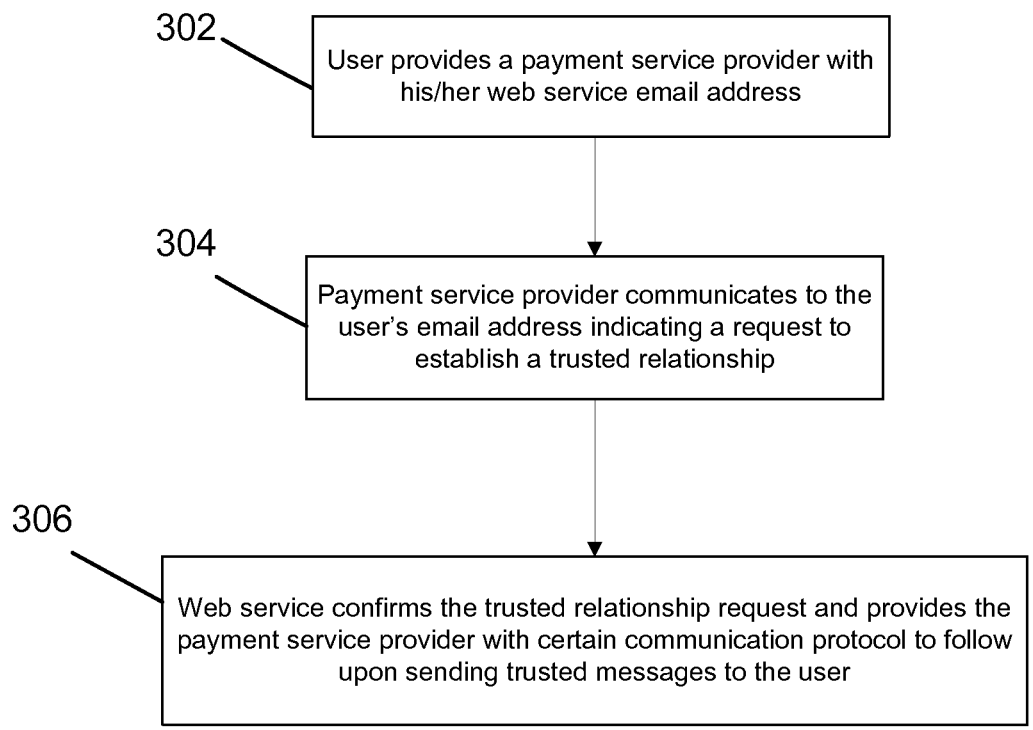
FIG. 3A depicts a process flow diagram for establishing a connection between the Vault and payment service providers in accordance with some embodiments of the present disclosure.

Turning to FIG. 3A, a process is described for establishing a trusted connection between a service provider 120, such as payment service providers including Banks or other merchants, and the Vault 105. A trusted connection enables a service provider 120 to send messages to a user's vault account within the Vault 105. According to an exemplary embodiment and discussed in more detail below, the information housed within the Vault originates from communications sent to a user. By way of a non-limiting example, User A has a credit card account with a credit card company, and has signed up for electronic bill pay.

As with current systems, the credit card company would send an email to User A notifying User A that a billing statement is available and requires User A's attention. User A would, after viewing the email, have to log-in to the credit card company's website, download the billing statement, then submit payment. After this, the credit card company would then send User A an email stating that the payment was received. This is time consuming, costly and resource intensive.

As discussed herein, the discussed systems and methods remedy this tedious procedure by providing an effective, convenient assembly and delivery of messages for facilitating electronic bill payment and online management. For example, prior to conducting business with the credit card company, User A can authenticate their email address with the credit card company. Such authentication includes the credit card company receiving and confirming a Vault address associated with the email address for User A. After the authentication, instead of sending a notification of a bill pending on the credit card company's website, the credit card company can send the bill (e.g., as a PDF) within an email to User A's Vault account within the Vault. User A will then receive a Vault notification in his email inbox, from which User A will conveniently be able to pay his credit card bill. In some embodiments, User A will be able to remit payment directly from the Vault 105.

According to some exemplary embodiments, the Vault 105 can only receive communications from trusted payment service providers 120. For ease of explanation in FIGS. 3A and 3B, the payment service provider 120 will be referred to as a Bank. However, this is not a limiting explanation. The process described herein can be established for any payment service provider 120, entity, vendor, agency, merchant, or user for which a user is required to remit payment and/or communicate in a secure fashion. For example, other payment service providers can include, but are not limited to, all types of financial institutions, electronic payment facilitators, credit card companies, hospitals, and other types of merchants and vendors. Moreover, one skilled the art will appreciate that various substitutions and modifications can be made to the examples described herein while remaining within the sprit and scope of the present disclosure.

In Step 302, a user provides a Bank with information that identifies the user, e.g., the user's email address. As discussed herein, the email address for the user is, for example, user@yahoo.com. The Bank is also provided with information for establishing a trusted relationship. This information can be in the form of a request or a message. This information includes identifying information that indicates a desire to establish a trusted relationship with the bank. That is, the user desires to receive billing communications sent according to a specified protocol. In Step 304, the Bank responds by sending a communication addressed to the user's email address. Within the communication, the Bank indicates that the communication is inline with establishing the trusted relationship for transmitting electronic billing statements. In response to receiving this communication, the web service 104 confirms the trusted relationship request and provides the Bank with certain protocol to follow upon sending billing statements to the user. Step 306. In some exemplary embodiments, the confirmation can include sending a secure link back to the Bank to confirm the linkage between the user and the Vault.

According to some embodiments, the communication protocol for establishing the trusted relationship can be achieved via 'handshaking' between the Bank and the web service, e.g., the Vault. This includes an automated process of negotiation between the bank and the web service that dynamically sets parameters of a communications channel established between two entities before normal communication over the channel begins. That is, the process establishes rules for communication between the Bank and the web service. In some embodiments, the establishment of the communication protocol via handshaking can be used to negotiate parameters that are acceptable to equipment and systems at both ends of the communication channel, including, but not limited to, information transfer rate, coding alphabet, parity, interrupt procedure, and other protocol or hardware features. Handshaking makes it possible to connect relatively heterogeneous systems or equipment over a communication channel without the need for human intervention to set parameters. For example, the Bank and web service can negotiate communication parameters for a brief period when a connection is first established, as in Steps 302-306, and thereafter use those parameters to provide optimal information transfer over the channel as a function of its quality, security and capacity, as discussed in FIG. 3B.

Furthermore, for example, Transport Layer Security (TLS) Handshake Protocol can be used to negotiate the secure attributes of the communications between the Bank's server(s) and the web service's server(s). TLS and its predecessor, Secure Sockets Layer (SSL), are cryptographic protocols that provide communication security over the Internet. TLS and SSL encrypt the segments of network connections above the Transport Layer, using asymmetric cryptography for key exchange, symmetric encryption for privacy, and a keyed message authentication code for message reliability. In accordance with the present disclosure, several versions of the protocols are in widespread use in applications such as web browsing, electronic mail, Internet faxing, instant messaging and voice-over-IP (VoIP) and can be used to establish the trusted relationship and subsequent communications between the service provider and Vault.

In yet another example, in establishing a trusted relationship, the information sent to the Bank can be a sample message to be mapped, where the sample message comprises a message header and associated header elements of source data. Thus, upon the Bank sending the sample message to establish a connection, the message body and associated body elements of the source data may be directly mapped to a corresponding message body and associated body elements of a target user or message. It is noted that the mapping procedure may be performed on an automated basis, such as by way of a mapping selection process or algorithm. This mapping process is suitable for facilitating training of the web service 104 to recognize and handle subsequent communications from the sending entity. In other embodiments, it also may facilitate training of the web service 104 for receiving instances of a given message.

According to some embodiments, only trusted senders, here the Bank, can communicate with a user's Vault 105 and Vault account. As discussed in more detail below in FIG. 3B, the trusted relationship involves the Bank transmitting billing statements either with proper metadata (or tags) that indicate that the communication is related to a billing statement, or transmitting the billing statements to an appropriate handle as supplied by the web service 104. According to some embodiments, the trusted relationship can also involve the Bank adhering to established communication protocol the web service 104 requests. For example, the web service 104 can request, or require, that the Bank follow pre-defined file transfer software programs such as the File Transfer Protocol (FTP) or enhanced FTP. FTP operates to establish a communication protocol to allow communication between the Bank and the user's Vault account. After the trusted relationship/connection between the Bank and the user has been established, as in Step 306, emails, documents or files may be transferred from the Bank to the user's Vault account.

Additionally, files may be transferred from the Bank to the user's Vault 105 over a network, e.g., the Internet, by using an internet protocol such as Hyper Text Transfer Protocol (HTTP). Additional security may be requested/required to the exchange of such messages by using HTTPS, a secure form of HTTP. That is, HTTPS may provide an additional level of security to information and files as they move between the Bank and the user's Vault. With regard to e-mail from the Bank to the user's Vault, e-mail applications are available today that include security features such as data encryption and digital signing. The use of these security features may be required by the service provider. Thus, all communications from the Bank regarding billing statements for the user may be encrypted and/or signed. Additionally, once the e-mail communication is received by at the user's Vault, the Vault can verify the signature. In some embodiments, the Vault can then decrypt the e-mail, and then store the decrypted version of the e-mail in the Vault. Also, any messages that might have been attached to the e-mail can be decrypted and stored. Similarly, other software programs and protocols that are available today may be instituted by the web service to provide advanced security in the exchange of such messages.

Turning to FIG. 3B, the process described relates to a payment service provider 120, e.g., the Bank, communicating an electronic billing statement to a user's Vault 105.

In Step 308, the Bank sends a billing statement email to the user following the web service 104 defined protocol for the trusted relationship. In one embodiment, the protocol can involve the Bank transmitting billing statements either with proper metadata (or header or tags). This metadata indicates that the communication is related to a billing statement. Thus, upon detection of such metadata, the web service could store this communication in the Vault for the user. Step 310. That is, the metadata can be used to identify whether the message is to be stored in the Vault 105 or the user's email client inbox. Step 312.

For example, the parser 115 of the Vault 105 can be configured to handle transmission/submission mediums of various types and messages conforming to various designs/formats. For example, the parser 115 can map metadata associated with a message in order to identify the message's contents and/or context, such as a sample PDF, image file or other document, to target the message for delivery to the Vault 105. The metadata can include, but not limited to, various components, including a message header and associated header elements, a message body and associated body elements.

By way of the example, the components of the metadata may be mapped to the Vault 105, and, in some embodiments, to an appropriate directory within the Vault 105, as discussed below in FIG. 4. In some embodiments, it is noted that parser 115 may enable selective or associative correlation between data elements of the messages and user's Vault account for enabling pattern, format or content recognition details that are implementable and conveyed in part based on a target schema applied by the parser 115. That is, the parser may be configured to categorize messages and their attached documents within directories and sub-directories in order for quick, convenient retrieval.

In another embodiment, the protocol for the trusted relationship can involve the Bank sending the billing statement email to another form of metadata, e.g., a specified handle affiliated with the user. Upon recognizing the handle associated with the transmitted message, the web service would store the message in the Vault. Step 314. As discussed above, for example, User A's Vault handle can be—userA@yahoo-vault.com. In some embodiments, this extension handle would be internally created by the web service 104 within the web service domain. Thus, messages communicated to the user that are destined for the Vault may be addressed to the Vault's handle (or extension) within the web service domain. Therefore, upon receiving the message, the web service's email server(s) would recognize the handle, by-pass the user's email inbox, and automatically store the message in the Vault.

For example, if User A has signed up for paperless statements from Merchant B, Merchant B normally would send billing emails to User A's email address—userA@yahoo.com. As above, implementing the Vault, Merchant B will still send billing emails to User A, but instead of User A's email address, the billing emails can be sent to User A's Vault account, e.g., userA@yahoo-vault.com. Therefore, all emails from Merchant B involving billing, would be sent to User A's Vault.

As discussed in Step 310, Merchant B's email would have metadata identifying that the message relates to a billing statement. Thus, the email would be identified by the web service as an email destined for User A's Vault. In another example, as discussed in Step 314, Merchant B's email would be addressed to User A's Vault handle; therefore, the message can automatically be stored within User A's Vault.

The reception of billing emails at User A's Vault avoids billing emails being lost or confused with personal emails within User A's email inbox. Also, the Vault, can communicate a notification to User A, either via SMS, or even an email to User A's email, notifying User A of a pending billing email. Therefore, User A can access his Vault, and begin the process of remitting payment. In some embodiments, as discussed above, the Vault can be configured to provide functionality so that payment can be made to Merchant B through the Vault. This can eliminate the need for User A to have to view the billing email, then access Merchant B's website in order to make said payment.

In Step 316, the received emails can be tagged and/or otherwise organized within the user's Vault account. According to some embodiments, the messages stored within the Vault can be searchable. In these instances, the messages may not be encrypted. Furthermore, according to some embodiments, upon storing the messages in the Vault, the messages can be sorted according to, but not limited to, sender, account number, date, time, billing amount and time period for payment due (priority). In other embodiments, if the messages received and stored in the Vault are encrypted, they may not be searchable.

The Vault can retain these messages indefinitely, or according to a predetermined time set by the user or web service, or in accordance with the Vault's storage restraints or established guidelines. In order to monetize this, service providers can structure different pricing/fees in accordance with the size of a user's Vault. For example, initially, a user's Vault may be allocated 1 Gigabyte of storage. However, for a higher subscription fee increased storage can be provided.

Figure 4:
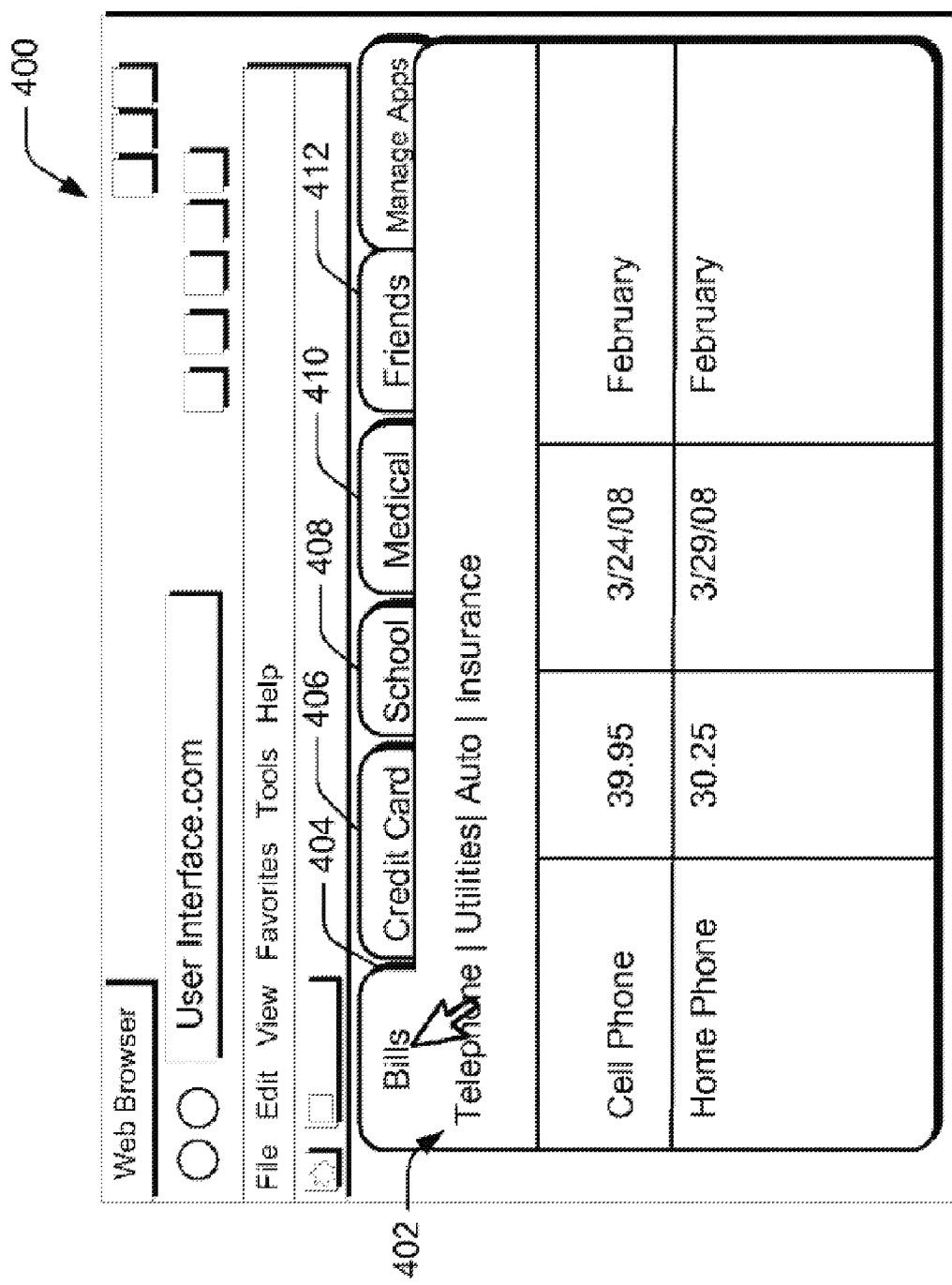
FIG. 4 depicts an example of a user interface for organizing received messages within a user's Vault in accordance with some embodiments of the present disclosure.

Turning to FIG. 4, a diagram is shown depicting organized received messages within a user's Vault in accordance with some embodiments of the present disclosure as discussed above in Step 316. According to some embodiments, the user may access his/her Vault via a browser 400 running on the user device. In some embodiments, the Vault is made accessible via a user interface displayed on the display of the user device. In some embodiments, the user can download a software application, referred to as the vault application. As discussed above, the vault application can provide secure access from the user device 106 to the Vault 105. The vault application allows the user to access the Vault, and vault account information associated with that user in a secure manner inline with the Vault's secure access processes via a user interface 400 displayed on the user device 106.

As illustrated in FIG. 4, a user interface 400 displayed on the user device 106 includes tabs which provide a hierarchical structure to a user's Vault 402. Example tabs include, but are not limited to bills 404, credit card 406, school 408, medical 410, friends 412. As discussed above in Step 316 of FIG. 3B, the user's Vault account can be organized so that the received documents are organized/categorized based on the data received in the messages (and message attachment documents). For example, as illustrated in FIG. 4, a user's Vault has been organized into directories based on messages' contents and the messages' senders. In this embodiment, the directories are visualized within the user interface by tabs. In other embodiments, the depiction of directories can take any form and/or implement any formatting structure to account for sorting content.

Thus, as illustrated, messages related to bills are organized under bills 404 tab, messages related to credit card transactions are organized under the credit card 406 tab, messages related to User A's school are organized under the school 408 tab, messages related to medical benefits or other medical topics are organized under the medical 410 tab, and so on. Further, as illustrated, upon interacting with a tab, the contents of the tab, and messages saved therein, may be organized according to the sub-type. For example, under the bills 404 tab, messages related to bills for telephone services, utilities, automobiles and insurance can be further sorted. As discussed above, the messages received can be parsed in order to identify the contents of the messages. As such, as shown in FIG. 4, the contents of the messages have been parsed and displayed for ease in the user understanding and identifying his/her payment responsibilities.

In some embodiments, a user's email client inbox may display tabs, as discussed above and illustrated in FIG. 4. That is, for example, within a user's email inbox, there may be a separate tab that includes indications that the user's Vault account has unread messages. These message may not be accessible via the email inbox, in that the user must separately and securely access their Vault account.

FIG. 5 is a block diagram illustrating an internal architecture of a computing device, e.g., a computing device such as server or user computing device, in accordance with one or more embodiments of the present disclosure. FIG. 5 illustrates a computer system upon which some exemplary embodiments of the present disclosure may be implemented. Although computer system 500 is depicted with respect to a particular device or equipment, it is contemplated that other devices or equipment (e.g., network elements, servers, processors) within can deploy the illustrated hardware and components of system 500.

As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, computer-readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by an Network or Internet Service Provider (ISP) 530. ISP equipment in turn provides data communication services through the public, world-wide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    communicating over a network from a user to an entity, a request comprising identification information associated with the user and provided by a web service;
    receiving, at a computing device, a response message from the entity addressed to the user in accordance with the identifying information, the response message indicating a desire to establish a trusted relationship between the entity and the web service;
    confirming, via the computing device, the trusted relationship between the entity and the web service based on the identifying information;
    establishing, via the computing device, a linkage between the user and a user account within a cloud-based repository associated with the web service; and
    communicating, over the network, a communication protocol to the entity, said communication protocol comprising instructions for communications between the entity and the repository.

2. The method of claim 1, further comprising:
    receiving, at the computing device, a message from the entity; and
    determining, via the computing device, whether the message was sent according to the communication protocol.

3. The method of claim 2, further comprising:
    transmitting the message to the repository if the message was sent in accordance with the communication protocol; and
    storing the message in the user's account within the repository.

4. The method of claim 2, further comprising:
    parsing the message to identify message information; and
    organizing the message within the user's account based upon the identified information.

5. The method of claim 1, wherein the communication protocol comprises the entity appending metadata to messages directed towards the user in order to identify the user's account within the repository as the destination.

6. The method of claim 1, wherein the communication protocol comprises the entity addressing messages for the user in accordance with metadata modified identifying information associated with the user.

7. The method of claim 6, wherein the metadata that modifies the identifying information is a web service designated handle specific to the user, wherein the handle indicates that the messages received from the entity are to be directed to the user's account within the repository.

8. The method of claim 2, further comprising:
transmitting the message in accordance with the identifying information associated with the user if the message is not sent via the communication protocol.

9. The method of claim 3, further comprising:
encrypting the stored message, said encryption enables only the user to access and decrypt the message, wherein said access and decryption of the message is private to the user.

10. The method of claim 3, further comprising:
notifying, over the network, the user of the stored message in the user's account within the repository.

11. The method of claim 1, wherein the user account within a cloud-based repository is allocated according to a pricing model, the pricing model enabling storage and encryption capabilities for the user account.

12. The method of claim 1, wherein the identifying information is an email address associated with the user provided by the web service, said identifying information is affiliated with the user's account within the cloud-based repository.

13. The method of claim 1, wherein said confirming the linkage between the user and the user account further comprises:
authorizing the user with the web service based upon a token provided by the web service, the token comprising key cryptography used to authorize the user access to the user's account within the cloud-based repository.

14. A method comprising: receiving, at a computing device, a message from an entity, the message comprising metadata designated by established communication protocol between the entity and a web service, the metadata indicating a linkage between a user and a user profile within a cloud-based repository;
analyzing, via the computing device, the metadata in order to identify said linkage;
parsing, via the computing device, the message to identify message information; and
based on said analysis, communicating the message to said repository, said communication facilitates storing the message in the repository, said storage comprising organizing the message based on the identified message information.

15. A non-transitory computer-readable storage medium tangibly encoded with computer-executable instructions, that when executed by a processor, perform a method comprising:
communicating over a network from a user to an entity, a request comprising identification information associated with the user and provided by a web service;
receiving a response message from the entity addressed to the user in accordance with the identifying information, the response message indicating a desire to establish a trusted relationship between the entity and the web service;
confirming the trusted relationship between the entity and the web service based on the identifying information;
establishing a linkage between the user and a user account within a cloud-based repository associated with the web service; and
communicating a communication protocol to the entity, said communication protocol comprising instructions for communications between the entity and the repository.

16. The non-transitory computer-readable storage medium of claim 15, further comprising:
receiving a message from the entity; and
determining whether the message was sent according to the communication protocol.

17. The non-transitory computer-readable storage medium of claim 16, further comprising:
transmitting the message to the repository if the message was sent in accordance with the communication protocol; and
storing the message in the user's account within the repository.

18. The non-transitory computer-readable storage medium of claim 16, further comprising:
parsing the message to identify message information; and
organizing the message within the user's account based upon the identified information.

19. The non-transitory computer-readable storage medium of claim 16, further comprising:
transmitting the message in accordance with the identifying information associated with the user if the message is not sent via the communication protocol.

20. The non-transitory computer-readable storage medium of claim 16, wherein the communication protocol comprises the entity appending metadata to messages directed towards the user in order to identify the user's account within the repository as the destination.

21. The non-transitory computer-readable storage medium of claim 16, wherein the communication protocol comprises the entity addressing messages for the user in accordance with metadata modified identifying information associated with the user.

22. The non-transitory computer-readable storage medium of claim 21, wherein the metadata that modifies the identifying information is a web service designated handle specific to the user, wherein the handle indicates that the messages received from the entity are to be directed to the user's account within the repository.

23. The non-transitory computer-readable storage medium of claim 17, further comprising:
encrypting the stored message, said encryption enables only the user to access and decrypt the message, wherein said access and decryption of the message is private to the user; and
notifying, over the network, the user of the stored message in the user's account within the repository.

24. A system comprising:
at least one computing device comprising one or more processors to execute and memory to store instructions to:
communicating over a network from a user to an entity, a request comprising identification information associated with the user and provided by a web service;
receiving a response message from the entity addressed to the user in accordance with the identifying information, the response message indicating a desire to establish a trusted relationship between the entity and the web service;
confirming the trusted relationship between the entity and the web service based on the identifying information;
establishing a linkage between the user and a user account within a cloud-based repository associated with the web service; and
communicating a communication protocol to the entity, said communication protocol comprising instructions for communications between the entity and the repository.

25. The system of claim 24, the at least one computing device comprising one or more processors to further execute and memory to further store instructions to:

transmitting the message to the repository if the message was sent in accordance with the communication protocol; and storing the message in the user's account within the repository.

26. The system of claim 25, the at least one computing device comprising one or more processors to further execute and memory to further store instructions to:

parsing the message to identify message information; and organizing the message within the user's account based upon the identified information.

27. The system of claim 25, the at least one computing device comprising one or more processors to further execute and memory to further store instructions to:

transmitting the message in accordance with the identifying information associated with the user if the message is not sent via the communication protocol.

28. The system of claim 25, the at least one computing device comprising one or more processors to further execute and memory to further store instructions to:

encrypting the stored message, said encryption enables only the user to access and decrypt the message, wherein said access and decryption message are private to the user; and notifying, over the network, the user of the stored message in the user's account within the repository.

* * * * *